G. WHITTAKER.
BUCKETS FOR ELEVATORS.
No. 180,809. Patented Aug. 8, 1876.
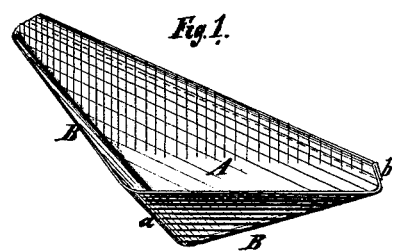
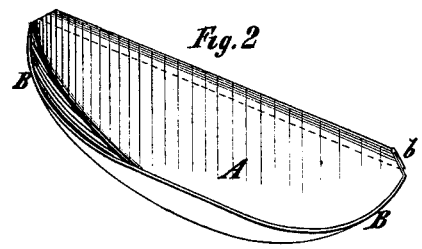
Witnesses:
E. Augentobler
Thomas E. Birch
George Whittaker
by his attorneys
Van der Veer & Brown

UNITED STATES PATENT OFFICE.

GEORGE WHITTAKER, OF BROOKLYN, NEW YORK.

IMPROVEMENT IN BUCKETS FOR ELEVATORS.

Specification forming part of Letters Patent No. 180,809, dated August 8, 1876; application filed June 28, 1876.

*To all whom it may concern:*

Be it known that I, GEORGE WHITTAKER, of Brooklyn, in the county of Kings and State of New York, have invented certain new and useful Improvements in Buckets for Elevators, of which the following is a specification:

This invention consists in a bucket made of a single piece of metal by means of dies, and having a greater bulge or projection at the center of the front than at the sides, whereby this article is not only rendered cheaper, stronger, and more durable than formerly, but it is also freed from liability to catch in the sides of the trough or casing of the elevator, and, owing to the absence of any joints, is rendered less liable to leak or spill its contents, and hence its efficiency is materially increased.

The invention also consists in an elevator-bucket having a flat triangular back and two triangular sides extending from the said back and meeting at the front, forming approximately an apex of a three-sided pyramid, and constituting an article which will not catch in the trough or casing of the elevator, and which, having a sharp nose at the center of its front, is admirably adapted for entering the material to be elevated, especially when this is of a heavy kind, such as clay, bones, or ore, and possesses great facility for discharging its contents.

In the accompanying drawing, Figure 1 is a perspective view of my improved elevator-bucket, and Fig. 2 is a perspective view of a modified form of bucket embodying the invention.

Each of the buckets represented is made of a single piece of metal, by means of one or more sets of dies, and hence is destitute of joints of any kind. This renders its construction simpler, strengthens it, and renders it more durable and efficient—more efficient because it obviates the parting of the joints, so common with the buckets now used, and the spilling or leaking of the contents of the buckets incident to the parting of its joints.

The bucket illustrated by Fig. 1 has a triangular back, A, and two triangular sides, B B, which extend forward from the side edges of the back and meet opposite the middle thereof. The shape of this bucket is approximately that of an apex of a three-sided pyramid, wherefore the bucket has a sharp nose, *a*, receding from top to bottom, and admirably adapted to embed itself into the material to be elevated.

This is valuable for all materials, but especially those of a heavy kind, such as clay, bones, or ore, as it is more difficult to fill buckets with them, and, of course, the efficiency of the elevator depends largely on the amount of the material which its buckets pick up and carry, and as this bucket flares or increases in size in every direction toward the mouth, its contents are discharged with great facility. This also increases the efficiency of the elevator, because it obviates the liability of part of the contents of the bucket remaining therein and being carried back.

The modified form of bucket represented in Fig. 2 has also a triangular back; but its sides and front are continuous, or, in other words, the sides join the front with curves. This bucket has not a nose, *a*, like the bucket shown in Fig. 1, but has the other advantages of the latter, and is very useful for light materials, such as grain.

Of course, these are not the only forms of buckets capable of being made of single pieces of metal by means of dies, but they are sufficient to illustrate my invention. In both these buckets the upper edge of the back is bent over against the body thereof to form a lap, *b*, for strengthening the metal where it is perforated to receive the rivets or other means whereby it is secured to the belt, endless apron, or carrier of an elevator.

What I claim as my invention, and desire to secure by Letters Patent, is—

1. An elevator-bucket made of a single piece of metal by means of dies, and having a greater bulge or projection at the center of its front than at the sides, substantially as and for the purposes set forth.

2. An elevator-bucket forming approximately an apex of a three-sided pyramid, having a triangular back and two triangular sides extending from the side edges of the back, and meeting opposite the middle of the back, and having a sharp nose, substantially as and for the purposes set forth.

GEORGE WHITTAKER.

Witnesses:
LEML. S. FITHIAN,
EDWIN H. BROWN.